March 1, 1960
P. MAUBORGNE
2,926,863
FISHING REEL
Filed Jan. 10, 1955
2 Sheets-Sheet 1
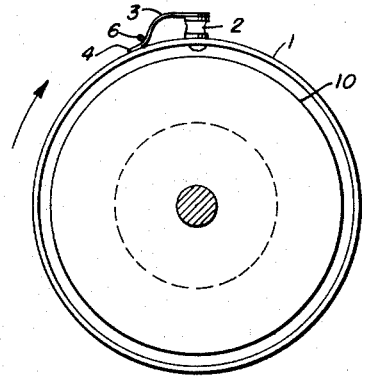
FIG.1
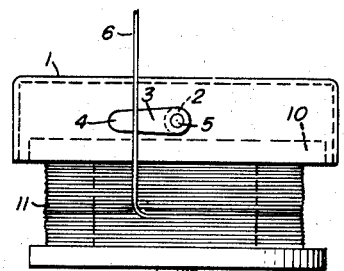
FIG.2
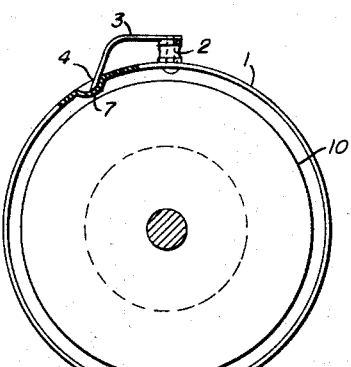
FIG.3
FIG.4
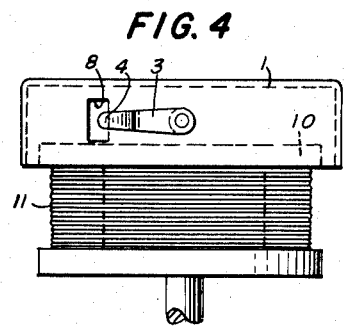
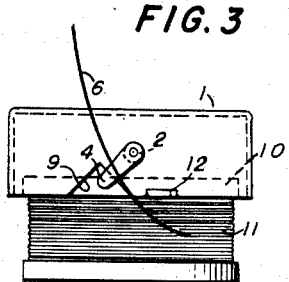
FIG.5
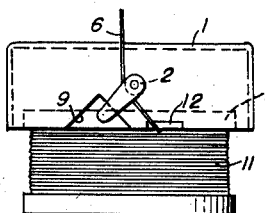
FIG.6
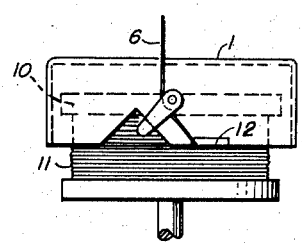
FIG.7
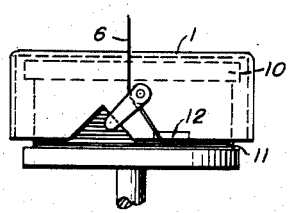
FIG.8
INVENTOR
PAUL MAUBORGNE
ATTORNEYS March 1, 1960 P. MAUBORGNE 2,926,863
FISHING REEL
Filed Jan. 10, 1955 2 Sheets-Sheet 2
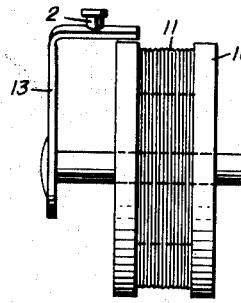
FIG. 9
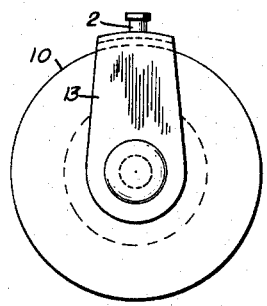
FIG. 10
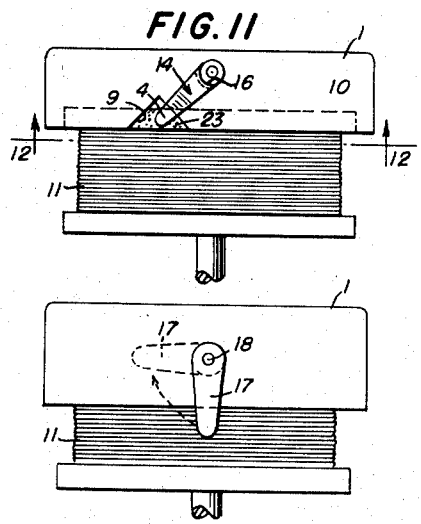
FIG. 11
FIG. 13
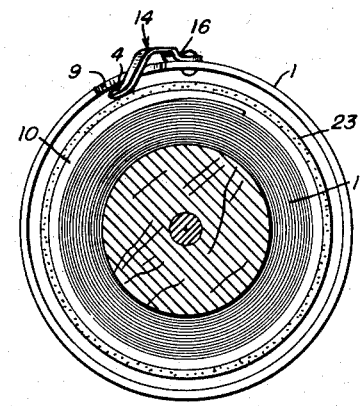
FIG. 12
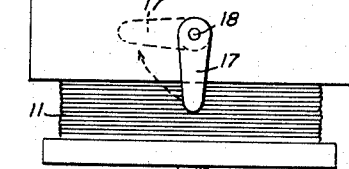
FIG. 14
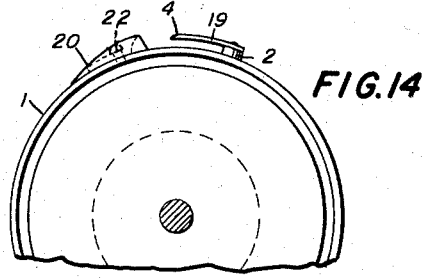
FIG. 15
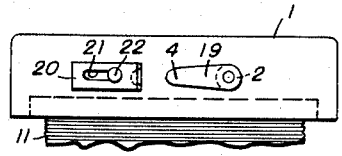
FIG. 16
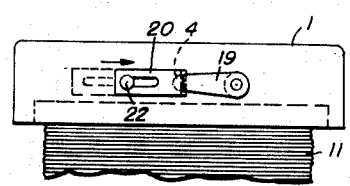
FIG. 17
INVENTOR
PAUL MAUBORGNE
BY
ATTORNEYS

United States Patent Office 2,926,863
Patented Mar. 1, 1960

2,926,863

FISHING REEL

Paul Mauborgne, Bernouville, Eure, France

Application January 10, 1955, Serial No. 480,971

Claims priority, application France January 25, 1954

8 Claims. (Cl. 242—84.2)

The invention relates to a fishing reel of the fixed-spool type, that is to say a spool, the axis of which is parallel with the direction of the line, and in which the spool remains stationary while the line is unreeled and wherein reeling-in is effected by rotating a carrier and the member termed the pick-up mounted on the carrier relatively to the spool, the said pick-up comprising a line fair lead and, if desired, a finger which guides the line towards the line fair lead at the beginning of the reeling-in operation.

In my U.S.A. Patent No. 2,600,558 I disclose a fishing reel of the type hereinbefore described which is mainly characterised in that the member carrying the line pick up, whether or not it be rotatable, is mounted in front of the spool.

The problem thus created by the troublesome interposition of the line pick up upon the path of the line at the moment of casting, that is to say at the moment of unreeling the line, has been resolved in various ways, for example, in the case in which the line pick up is formed by a ridge or groove, by compensating for the pick up point with a relative longitudinal movement which displaces the pick up from the spool at the moment of casting (which movement must not be confused with the longitudinal reciprocating movement known per se which is employed to distribute the line over the spool during the reeling-in operation), or, for example, when a line pick up forming a radial projection is concerned, by withdrawing the line pick up within the cylinder which is geometrically circumscribed upon the spool or by the two means simultaneously.

The invention has as its subject an extremely simple pick-up which requires neither axial displacement of the pick-up relatively to the spool at the moment of casting nor retraction of the pick up by means of which the latter is brought within the cylinder which encircles the spool.

To this end, the pick-up according to the invention comprises a line engaging means combined with a line-guiding device or finger of such type that, during the unreeling operation, the line is so deflected as to pass above the line engaging means along a continuous guiding surface free from projecting points that could catch the unreeling line.

In one embodiment of the invention, the member known as a finger, the normal function of which is to bring the line under the pick up at the beginning of the winding-in operation and which is in the prior art displaced, effaced or compensated for during unreeling, is employed, according to the invention, to deflect the line and move it away from the pick up during the unreeling operation while still retaining its function as a line guiding portion at the beginning of the reeling-in operation.

Constructional examples of the invention will hereinafter be described without intending to limit the generic range thereof to the features described in the examples chosen by way of explanation.

In the accompanying drawings, wherein only those parts of the reel which are necessary for understanding the invention are illustrated:

Figure 1 is an elevational view partly in section of the member carrying the line pick up;

Figure 2 is a plan view of the same device;

Figure 3 is a view similar to Fig. 1 of a variant;

Figure 4 is a plan view of another variant;

Figure 5 is a plan view of another variant;

Figures 6, 7 and 8 are views of the device of Figure 5 which illustrate the relative positions of the spool and of the member bearing the line pick up during the reciprocating reeling-in movement;

Figure 9 is a side view of a construction of the invention with the member bearing the line pick up constructed in the form of an arm or bracket;

Figure 10 is a front view of the device of Figure 9;

Figure 11 is a view similar to Fig. 5 showing a special embodiment of the line pick up and of the guide finger attached thereto;

Figure 12 is a sectional view taken on line 12—12 of Fig. 11;

Figure 13 is a plan view of another form of the device;

Figures 14 and 15 are fragmentary views similar to Figs. 1 and 3 showing two different positions of another variant of the device according to the invention;

Figures 16 and 17 are fragmentary plan views which correspond to Figs. 14 and 15, respectively.

In a first example, to which Figures 1 and 2 refer, the pick-up 2, 3, 4 is mounted on the carrier or a shell 1 and the line pick up includes a roller or fair lead 2 fitted to the cylindrical outer surface of shell 1. The said roller may be stationary or so fitted as to be capable of rotating about its own axis.

Fitted to the shaft of the roller or fair lead 2 is a leaf spring finger 3 which may be so shaped that the end 4, opposite the end secured to fair lead 2, bears with some force against the outer surface of carrier 1.

In order that the outer surface of the carrier and pick up thereon may be devoid of any projection liable to stop the line, the spring finger is fixed to the shaft of the roller, for example, by a countersunk screw 5.

While the line 6 is being unreeled, during which operation it moves in the direction of the arrow in Figs. 1 and 2, it will pass over the roller without engagement therewith.

In order to reel in, the angler lifts the end 4 of the spring finger 3 in order to engage the line below finger 3 to engage the fair lead 2.

In order that the pointed part 4 may not present any projection liable to stop the line in unreeling, it is possible to provide on the surface of carrier 1 a slight depression as illustrated at 7 in Figure 3 so that the line can readily pass over the pointed part 4 which extends into the slight depression 7.

Instead of a depression 7, there can be as illustrated in Figure 4, in the member 1 a cut-away portion 8 into which the pointed part 4 of the spring extends.

It is also possible to provide instead of a cut-away portion 8, a notch 9 which is illustrated in Figure 5 and into which the point 4 engages and, as seen in Fig. 12, point 4 may contact the edge of the spool flanges.

Figures 6, 7 and 8 show that the line pick up device according to the invention, together with its guide member 3, is completely compatible with the normal axial reciprocating movement which occurs during reeling-in and which, as is known, has the effect of distributing the line satisfactorily over the whole spool. The manner, and the structure, by which the carrier 1 is rotated and reciprocated axially is clearly described in the prior art and particularly in my earlier Patent 2,600,558 referred to above.

Figure 5 shows that the notch 9 will not lead the fishing line under the finger at 4 when the outer flange 10 of spool 11 is in the position shown in Figure 5, whereas when the carrier is in the position shown in Figure 7 the fishing line will be led under finger 4 to bear against the fair lead 2. Upon continued rotation of the carrier 1, the line will be wound on spool 11 as shown in Figs. 6, 7 and 8. The fishing line being released manually from the pick up and the carrier moved to the position of Fig. 5, that is, into the casting position, that is to say the position in which the line is unreeled, during which time the latter must pass by the fair lead 2 without becoming engaged therewith.

It is expedient to provide at 12, that is to say at the point where fishing line comes into contact with the edge of the member 1 when reeling in, a wearing element capable of withstanding the rubbing of the line at this point. This member can therefore be given a shape suitable for reducing the angle at which the line is deflected.

As a safeguard, the rim of the outer flange 10 of the spool can be provided, as shown in Figure 12, with a fitting of flexible material 23 which comes into contact with the projection 4 and helps to prevent any undesired passage of the line beneath the finger 3, 4, even though the line may be very thin.

It will be noted that it is not necessary for the axis of the roller 2 to be perpendicular to the surface of the carrier member 1 and the said axis may, for example, be inclined to some extent in order to facilitate the deflection of the line.

Similarly, it is unnecessary for the carrier element for the pick up to be of annular or shell shape.

The pick-up according to the invention can be readily fitted to an arm 13 in the shape of a bracket such as is illustrated in Figures 9 and 10. The roller or fair lead 2 is then mounted on the said arm 13. For the sake of clarity in the drawings, the finger 3 has not been shown in these two figures.

It is also not essential for the line pick up to include a roller, any other method of leading the line being suitable.

Figures 11 and 12 illustrate a variant wherein the line pick up and the fair lead are formed by a single member 14 which is secured to the carrier 1 by a countersunk screw and has a portion 16 which forms the leading surface for the line and terminates in a point 4 which penetrates into a notch 9 to the extent necessary for satisfactory retraction.

Figures 11 and 12 also show the use of a covering 23 on the edge of flange 10 to be contacted by the end 4 of the spring finger.

In the construction as shown in Figure 13, the finger 17 has been movably arranged about a pin 18 in such manner as to be capable of taking up either the position illustrated in full line, in which case it overhangs the spool 11, or the position illustrated in chain lines, which is the unreeling position, where the finger member 17 serves to make the line pass above the line pick up.

Finally, Figures 14 to 17 illustrate by way of example a construction wherein the line finger 19, while still being fitted to the pin and being located above the roller 2 has its point 4 permanently located at some distance from the surface of the carrier 1 so as to be able to perform its normal function as a line guiding portion at the beginning of the reeling-in operation (Figures 14 and 16 respectively).

Contrary thereto, during the unreeling operation, the point 4 is covered by a hollow cover 20, the inner face of which is shaped to follow intimately the circular outline of the member 1 and has a slot 21 enabling it to slide upon the surface of member 1 to which it is fixed by the pin 22 which serves as a guide for the slot 21.

In Figures 15 and 17, which correspond to the unreeling operation, it will be seen that the line can pass without becoming engaged above the cover 20 and then above the finger 19 which causes the line to pass above the roller 2.

I claim:
1. In a fishing reel including a spool arranged to hold a line and mounted for free delivery of the line therefrom substantially axially of the spool, comprising a line pick up and a rotatable carrier member for said line pick-up, said carrier having a cylindrical surface coaxial with said spool, the said pick-up being carried externally on said cylindrical surface and including guide means to deflect the line above the line pick-up.

2. In a fishing reel of the type described in claim 1, in which said line pick up includes a leaf spring having an angular portion to catch the line and a continuous guiding part to guide the line above said angular portion.

3. The fishing reel of claim 1, in which said line pick up comprises a leaf spring secured at one end to said cylindrical surface selectively movable into position parallel to the generatrix of said cylindrical surface with the unsecured end of said spring extending over the edge of said cylindrical surface and over said spool, or to another position where said unsecured end bears on the said cylindrical surface.

4. The fishing reel of claim 1, in which said line pick up includes a spring mounted by one extremity on the exterior surface of said carrier, and including guide means to guide the line above the other extremity of said spring.

5. The fishing reel of claim 1, in which said cylindrical surface is provided with a notch in its edge adjacent said spool, said line pick up comprising a leaf spring, one extremity of said leaf spring being secured to the outer surface of said carrier member and the other end extending into said notch.

6. The fishing reel of claim 5, in which said extremity of said leaf spring extending into said notch contacts the edge of said spool when in casting position.

7. The fishing reel of claim 1, in which said pick up includes a leaf spring having a free end, the other end of said spring being secured on the outer surface of said carrier and having a bowed portion intermediate the free end and the secured end, said bowed portion being disposed above the surface of said carrier, the carrier having a cut-away portion in its outer cylindrical surface, said portion being located in a part of the surface to allow the free end of the spring to penetrate into said cut-away portion, whereby the line can readily pass over the free end of said spring while casting without being engaged therewith.

8. In a fishing reel including a spool arranged to hold a line and mounted for free delivery of the line therefrom substantially axially of the spool, a line pick-up, a carrier member for said line pick-up having an outer cylindrical surface coaxial with and relatively rotatable with respect to said spool, said pick-up being fixed on said outer cylindrical surface of said carrier, said pick-up including a leaf spring finger having a free end resting upon said surface, the other end being secured to said carrier and having a bowed portion intermediate the free end and the secured end, whereby the line may be selectively engaged under said spring and guided thereby while reeling in, or deflected above said line pick-up while casting without being engaged thereby.

References Cited in the file of this patent

UNITED STATES PATENTS

| | | |
|---|---|---|
| 1,210,320 | Hughes | Dec. 26, 1916 |
| 2,566,344 | Lord | Sept. 4, 1951 |
| 2,613,468 | Hand | Oct. 14, 1952 |
| 2,675,975 | Ferguson | Apr. 20, 1954 |

FOREIGN PATENTS

| | | |
|---|---|---|
| 938,912 | France | Apr. 12, 1948 |